United States Patent
Cairo et al.

(10) Patent No.: US 6,830,437 B2
(45) Date of Patent: Dec. 14, 2004

(54) ASSEMBLY CONTAINING A COMPOSITE ARTICLE AND ASSEMBLY METHOD THEREFOR

(75) Inventors: Ronald Ralph Cairo, Greer, SC (US); Paul Stephen Dimascio, Greer, SC (US); Christopher Grace, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 10/248,055

(22) Filed: Dec. 13, 2002

(65) Prior Publication Data

US 2004/0115395 A1 Jun. 17, 2004

(51) Int. Cl.$^7$ .............................. F01D 25/08; F02C 7/20
(52) U.S. Cl. .............................. 416/241 B; 415/173.1; 415/173.6; 415/200; 60/753
(58) Field of Search ......................... 60/753; 415/170.1, 415/173.1, 173.6, 197, 200; 416/174, 241 B; 428/131, 137

(56) References Cited

U.S. PATENT DOCUMENTS 2,919,549 A * 1/1960 Haworth et al. ............... 60/753
6,042,315 A * 3/2000 Miller et al. ................ 411/411
6,648,597 B1 * 11/2003 Widrig et al. ............... 415/200
6,718,774 B2 * 4/2004 Razzell ........................ 60/753

FOREIGN PATENT DOCUMENTS

DE          3625056 A1 * 1/1988     ............ F23M/5/02

* cited by examiner

*Primary Examiner*—Edward K. Look
*Assistant Examiner*—Richard A. Edgar
(74) *Attorney, Agent, or Firm*—Ernest Cusick; Gary M. Hartman; Domenica N. S. Hartman

(57) ABSTRACT

An assembly that includes a CMC article, and a method of forming the assembly, so as to reduce the likelihood during a transient thermal condition of the CMC article becoming interlocked with the worn shank of a fastener used to secure the article to its support structure. The CMC article has oppositely-disposed first and second surfaces, a hole through the article and intersecting the first and second surfaces so as to define oppositely-disposed first and second openings at the first and second surfaces, respectively, and continuous chamfers along the entirety of the first and second openings. The assembly further includes a support structure adjacent the article, and a fastener received in the hole of the CMC article and securing the CMC article to the support structure. The location of the chamfers at the perimeter of each opening eliminates a relatively sharp edge that could interlock with the worn shank of the fastener during a thermal excursion.

28 Claims, 2 Drawing Sheets

ASSEMBLY CONTAINING A COMPOSITE ARTICLE AND ASSEMBLY METHOD THEREFOR

BACKGROUND OF INVENTION

1. Field of the Invention

The present invention generally relates to components formed of composite materials, such as a ceramic matrix composite (CMC). More particularly, this invention relates to CMC components that require securement with metal fasteners to adjacent metal components in high temperature applications, such as gas turbine engines.

2. Description of the Related Art

Higher operating temperatures for gas turbine engines are continuously sought in order to increase their efficiency. While significant advances in high temperature capabilities have been achieved through the formulation of iron, nickel and cobalt-base superalloys, the high temperature properties of these metal alloys alone are often insufficient to withstand long exposures to operating temperatures within the turbine, combustor and augmentor sections of some high-performance gas turbine engines. As a result, internal cooling of components such as combustion liners, blades (buckets) and nozzles (vanes) is often employed, alone or in combination with thermal barrier coating (TBC) systems on their exterior surfaces. Alternative materials have also been investigated, such as ceramic matrix composite (CMC) materials whose high temperature capabilities are able to significantly reduce cooling air requirements. CMC materials, particularly continuous fiber-reinforced CMC materials, are currently being considered for shrouds, combustor liners, nozzles, and other high-temperature components of gas turbine engines.

The use of CMC's in gas turbine engines has created a need for high temperature attachments to interface with adjacent metal support structures and components. The large difference in thermal expansion rates between metals and CMC's creates unique attachment design problems, especially when metal fasteners are used. Metal fasteners, such as pins, bolts, etc., are desirable because of their high fracture toughness and their compatibility with adjacent metal components. Because of the significant difference in coefficients of thermal expansion (CTE) of a CMC component, its metal support structure, and the one or more metal fasteners used to secure the component to the support structure, clearance must be provided to permit the fastener and support structure to expand and contract relative to the CMC component during thermal excursions. However, CMC materials are harder than most metals, and therefore tend to wear into metal fasteners during the long periods of component vibration inherent in gas turbine operation. FIG. 1 represents such a situation, in which a CMC component 10 is secured to a metal structure 12 with a metal pin 14, and shows the shank 16 of the pin 14 as being severely worn as a result of vibration or other relative movement between the component 10 and structure 12. In FIG. 1, the diametric clearance between the pin 14 and component 10 is exaggerated for purposes of illustration. Wear is shown as having occurred on the shank 16 of the pin 14 as a result of the pin 14 being formed of a softer material than the CMC material that forms the component 10.

Problems can arise when a transient thermal condition occurs, causing relative motion between the pin 14 and the CMC component 10 as a result of the abrupt temperature change and the significant CTE mismatch between the component 10 and pin 14. For example, FIG. 2 represents the perimeter 18 of the through-hole in the CMC component 10 of FIG. 1 as being interlocked with the worn shank 16 of the pin 14 as a result of a transient thermal condition. The resulting restraint of the CMC component 10 can cause a sudden overload of the component 10, or localized damage to the component 10 that can expose damaged laminae to environmental decay, such as by oxygen embrittlement.

In view of the above, it would be desirable to avoid or at least minimize the damage that CMC components may sustain when secured with metal fasteners to a metal structure and subjected to differential thermal expansion and contraction under transient thermal conditions.

SUMMARY OF INVENTION

The present invention provides an assembly that includes a CMC article, and a method of forming the assembly, so as to reduce the likelihood during a transient thermal condition of the CMC article becoming interlocked with the worn shank of a fastener used to secure the article to its support structure.

A CMC article to which this invention generally applies has oppositely-disposed first and second surfaces, a hole through the article and intersecting the first and second surfaces so as to define oppositely-disposed first and second openings at the first and second surfaces, respectively. According to the invention, the CMC article is fabricated to have continuous chamfers along the entirety of the first and second openings. The assembly in which the CMC article is installed includes a support structure adjacent the article, and a fastener received in the hole of the CMC article and securing the CMC article to the support structure. The location of the chamfers at the perimeter of each opening eliminates a relatively sharp edge that could interlock with the worn shank of the fastener during a thermal excursion.

In view of the above, it can be appreciated that the CMC article of this invention is able to avoid or at least minimize the potential damage that might otherwise occur as a result of differential thermal expansion and contraction of the article relative to its support structure during transient thermal conditions. The assembly method by which this benefit is obtained simply involves fabricating the CMC article to have the dual chamfered openings, and then mounting the article to the support structure by positioning the article adjacent the structure and then securing the article with a fastener that is received in the chamfered hole. By accommodating the inevitable wear that occurs between a relatively hard CMC article and a softer (e.g., metal) fastener used to secure the article, the article is less likely to become unduly restrained by the fastener during a transient thermal condition.

Other objects and advantages of this invention will be better appreciated from the following detailed description.

DETAILED DESCRIPTION

Figure 1:
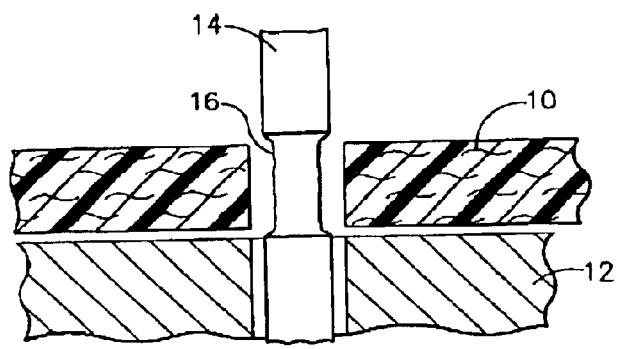
FIG. 1 represents a cross-sectional view of an assembly in which a CMC component is secured to a support structure with a metal fastener, and shows the shank of the fastener as being worn as a result of vibration or other relative movement between the component and support structure.
Figure 2:
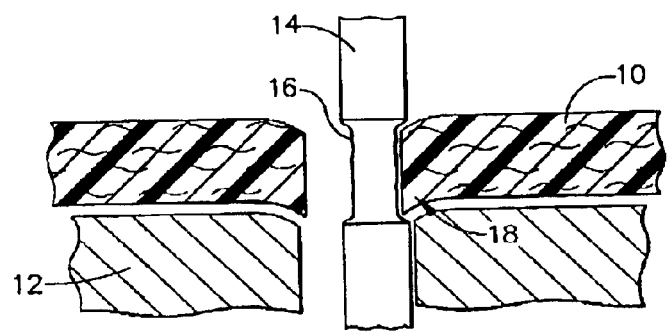
FIG. 2 represents the assembly of FIG. 1, in which the CMC component is interlocked with the worn shank of the fastener as a result of a transient thermal condition.
Figure 3:
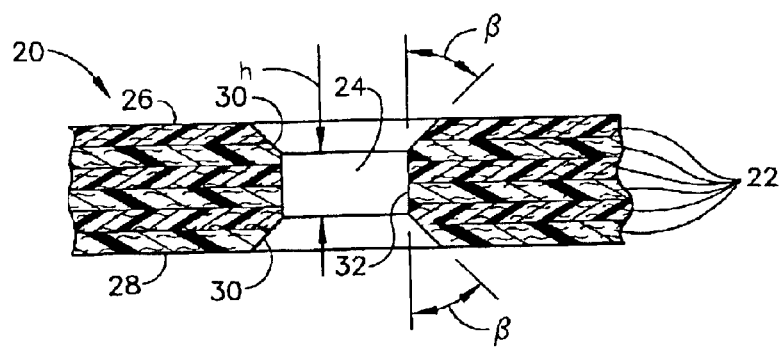
FIGS. 3, 4 and 5 represent CMC components with through-holes modified in accordance with three embodiments of this invention.
Figure 4:
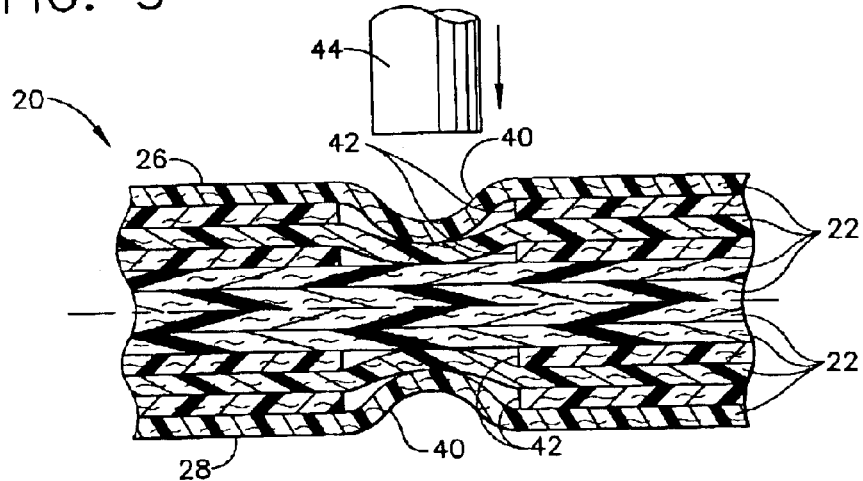
Figure 5:
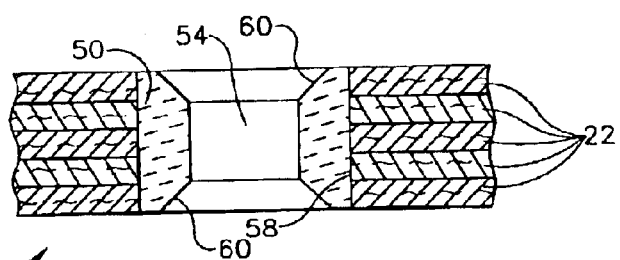

Represented in FIGS. 3, 4 and 5 are three sectional views of a CMC component 20 intended to be installed in an environment in which movement of the component 20 relative to a support structure (e.g., the structure 12 of FIGS. 1 and 2) occurs and may lead to damage to the component 20. The invention has direct application for restraining a CMC component of a gas turbine engine, such as a CMC shroud surrounding the outer blade tips within the turbine section of a gas turbine engine. Other potential applications include, but are not limited, to combustor liners and nozzles (vanes). The particular type of CMC material used to form the component 20 is not critical to the invention. Generally, CMC materials of the type used in gas turbine engine applications will have a laminate construction. This type of construction is represented in FIGS. 3, 4 and 5, in which multiple layers (laminae) 22 of continuous fiber-reinforced CMC material are used to build up the component 20. Suitable continuous fiber-reinforced CMC materials include silicon carbide, silicon nitride or silicon fibers in a silicon carbide, silicon nitride and/or silicon-containing matrix material. Each layer 22 generally contains sets of fiber bundles or tows (not shown) woven in a suitable weave pattern.

As represented in FIG. 3, the component 20 is fabricated to have a through-hole 24 with a double chamfer, in which the openings defined by the through-hole 24 at the opposite surfaces 26 and 28 of the component 20 have a continuous chamfer 30 along each of their perimeters. Between the chamfers 30, a necked region 32 of the hole 24 is defined that will contact a fastener (e.g., metal pin in FIGS. 1 and 2) used to secure the component 20 to its support structure (e.g., structure 12 in FIGS. 1 and 2). The chamfers 30 enable the component 20 to freely ride up and down the shank of the fastener without interlocking, even after the shank has become severely worn (e.g., FIG. 2) as a result of the fastener being formed of a softer material than the component 20. Preferred angles ($\beta$) for the chamfers 30 relative to the central axis of the hole 24 will vary as a function of the pin material, coefficient of friction between the pin and CMC component, the existence of any external coating on the component 20 and/or pin that may be desired for environmental or thermal protection, and the combination of in-plane and out-of-plane loading on the component 20 in its particular application. In a preferred embodiment, the chamfers 30 are disposed at essentially identical angles to the central axis of the hole 24, with a suitable range for the angles being about 30 to about 45 degrees. A suitable contact height (h), defined by the necked region 32 of the hole 24, will also be a function of the in-plane loading on the component 20.

In the fabrication of the component 20, a desired number of laminates are laid-up to form a preform. Prior to lay-up, each laminate would typically have undergone infiltration with a desired matrix material in accordance with known techniques, followed by consolidation, densification, and partial curing (B-staging). Following lay-up, the component preform would undergo additional consolidation, densification and final curing (firing) to form the component 20. Appropriate processing techniques and parameters depend on the particular composition of the CMC material, and therefore will not be discussed here.

The hole 24 and chamfers 30 in FIG. 3 are depicted as being formed by machining or otherwise removing material from the pre or post-fired component 20. In an investigation leading up to this invention, a CMC component was fabricated to have machined through-holes of the type shown in FIG. 3. The component was formed of a continuous fiber-reinforced CMC material comprising silicon carbide in a silicon carbide matrix material, and had a wall thickness of 0.2 inch (about 5.1 mm). After firing, holes were machined in the component wall to have diameters of about 0.3 inch (about 7.6 mm), after which chamfers were machined at angles ($\beta$ in FIG. 3) of about 45 degrees to the hole axes, yielding a contact height (h in FIG. 3) of about 0.1 inch (about 2.5 mm). The component was then secured to a support panel formed of Haynes HR120 nickel-base alloy with pins formed of L-605 cobalt-base alloy and having shank diameters of about 0.25 inch (about 6.4 mm), and then subjected to vibration and thermal cycling between about 700° F. and about 2500° F. (between about 370° C. and about 1370° C.) to simulate conditions within the hot gas path of a gas turbine engine. At the completion of about 180 hours of testing, though the pins exhibited significant wear from contact with the CMC component, there was no visible damage to the CMC component indicative of any interlocking between the component and the worn pins.

With CMC materials, it may be preferable to form, rather than machine, a through-hole because machining operations risk damage that can lead to local delamination failure or environmental degradation. Accordingly, FIGS. 4 and 5 represent two alternative techniques for forming through-holes, and which are capable of better preserving the structural integrity of the component 20. In FIG. 4, depressions 40 have been formed in the opposite surfaces 26 and 28 of the component 20 with the preforming process as a result of a composite fabrication practice known as lamina drop-offs. With this technique, transition spaces 42 are present in certain layers (transitional laminae) 22 of the component 20, and overlying layers 22 drop into the spaces 42 creating the characteristic depressions 40 shown in FIG. 4. Following the forming of the through-hole with a pin-mandrel 44 or other suitable tool to displace the tows in the planes of the layers 22, the edges of the depressions 40 will define the desired chamfers (e.g., 30 in FIG. 3) where the through-hole intersects the surfaces 26 and 28 of the component 20. An advantage of this hole and chamfer-forming technique is a higher panel transverse load and shear transfer capability. However, there is the possibility of stress concentrations at the drop-off points created by the spaces 42. Therefore, the embodiment of FIG. 4 is believed to be preferred with laminates of thickness of about 0.150 inch (about 3.8 mm) or more where the transitional laminae represent a relatively small amount (e.g., about 15%) of the total laminae.

Finally, FIG. 5 represents an approach in which an annular-shaped insert 50 is incorporated into the component 20 to simultaneously define both a through-hole 54 and dual chamfers 60 surrounding the through-hole 54. The insert 50 is preferably incorporated into the component 20 during lay-up of the layers 22, during which the insert 50 is received within a hole 58 punched or otherwise formed during the preform stage, such that the insert 50 becomes bonded by sintering during final curing (firing) of the CMC material. For thermal compatibility, the insert 50 is preferably a monolithic casting of the same material as the matrix material of the CMC material, e.g., silicon carbide or silicon nitride, though it is foreseeable that other materials could be used as long as the chosen material is chemically stable and has a compatible coefficient of thermal expansion in the service environment of the component 20. An advantage of the embodiment shown in FIG. 5 is the elimination of the possibility of lamina termination driven stress concentrations. On the other hand, the use of an insert 50 can have the effect of reducing the transverse load transfer capability in comparison to the embodiment of FIG. 4. As such, the embodiment of FIG. 5 is believed to be most suitable for use with relatively thin laminates, such as thicknesses of about 0.050 to about 0.150 inch (about 1.3 to about 3.8 mm).

While the invention has been described in terms of a preferred embodiment, it is apparent that other forms could be adopted by one skilled in the art. Therefore, the scope of the invention is to be limited only by the following claims.

What is claimed is:

1. An assembly for installation in a gas turbine engine, the assembly comprising:
    a ceramic matrix composite article having oppositely-disposed first and second surfaces, a hole through the article and intersecting the first and second surfaces so as to define oppositely-disposed first and second openings at the first and second surfaces, respectively, and continuous chamfers along the entirety of the first and second openings;
    a support structure adjacent the article; and
    a fastener received in the hole and securing the article to the support structure, the fastener being formed of a softer material than the article.

2. An assembly according to claim 1, wherein the chamfers are disposed at approximately equal angles relative to an axis of the hole.

3. An assembly according to claim 1, wherein the chamfers are disposed at an angle of about 30 to about 45 degrees relative to the axis of the hole.

4. An assembly according to claim 1, wherein the article comprises multiple laminated layers, and the hole and chamfers are defined by removed portions of the laminated layers.

5. An assembly according to claim 1, wherein the article comprises multiple laminated layers, and the chamfers are defined by drop-offs within the laminated layers.

6. An assembly according to claim 1, wherein the hole and chamfers are defined by a monolithic annular-shaped insert secured within a larger second hole in the article.

7. An assembly according to claim 6, wherein the insert is formed of a ceramic material.

8. An assembly according to claim 1, wherein the article is installed in a gas turbine engine.

9. An assembly installed an a gas turbine engine, the assembly comprising:
    a ceramic matrix composite article comprising multiple laminated layers that define oppositely-disposed first and second surfaces, a hole through the article and intersecting the first and second surfaces so as to define oppositely-disposed first and second openings at the first and second surfaces, respectively, and continuous chamfers along the entirety of the first and second openings;
    a metal structure contacting the article so that one of the surfaces of the article faces a surface of the metal structure; and
    a metal fastener received in the hole and securing the article to the metal structure, the fastener being formed of a metal that is softer than the article.

10. An assembly according to claim 9, wherein the chamfers are disposed at approximately equal angles relative to an axis of the hole.

11. An assembly according to claim 9, wherein the chamfers are disposed at an angle of about 30 to about 45 degrees relative to the axis of the hole.

12. An assembly according to claim 9, wherein the hole and chamfers are defined by removed portions of the laminated layers.

13. An assembly according to claim 9, wherein the chamfers are defined by drop-offs within the laminated layers.

14. An assembly according to claim 9, wherein the hole and chamfers are defined by a monolithic annular-shaped ceramic insert secured within a larger second hole in the article.

15. A method of assembling a composite matrix composite article to a support structure of a gas turbine engine, the method comprising the steps of:
    forming the article to have oppositely-disposed first and second surfaces, a hole through the article and intersecting the first and second surfaces so as to define oppositely-disposed first and second openings at the first and second surfaces, respectively, and continuous chamfers along the entirety of the first and second openings;
    positioning the article adjacent the support structure; and then
    securing the article to the support structure with a fastener received in the hole, the fastener being formed of a softer material than the article.

16. A method according to claim 15, wherein the chamfers are formed in the article so as to be disposed at approximately equal angles relative to an axis of the hole.

17. A method according to claim 15, wherein the chamfers are formed in the article so as to be disposed at an angle of about 30 to about 45 degrees relative to the axis of the hole.

18. A method according to claim 15, wherein the article is formed of multiple laminated layers, and the hole and chamfers are exclusively defined by removing portions of the laminated layers.

19. A method according to claim 15, wherein the article is formed of multiple laminated layers, the chamfers are defined by forming drop-offs within the laminated layers, and the hole is defined by forcing a mandrel through the laminated layers.

20. A method according to claim 15, wherein the hole and chamfers are defined by forming a larger second hole in the article, and then securing a monolithic annular-shaped insert within the second hole.

21. A method according to claim 20, wherein the insert is formed of a ceramic material.

22. A method according to claim 15, wherein the step of securing the article to the support structure results in the article being installed on the gas turbine engine.

23. A method of assembling a composite matrix composite article to a metal structure of a gas turbine engine, the method comprising the steps of:
    forming a ceramic matrix composite article comprising multiple laminated layers that define oppositely-disposed first and second surfaces, a hole through the article and intersecting the first and second surfaces so as to define oppositely-disposed first and second openings at the first and second surfaces, respectively, and continuous chamfers along the entirety of the first and second openings;
    positioning the article adjacent a metal structure of a gas turbine engine so that one of the surfaces of the article faces a surface of the metal structure; and then
    securing the article to the metal structure with a metal fastener that is received in the hole as a result of the securing step, the fastener being formed of a metal that is softer than the article.

24. A method according to claim 23, wherein the chamfers are disposed at approximately equal angles relative to an axis of the hole.

25. A method according to claim 23, wherein the chamfers are disposed at an angle of about 30 to about 45 degrees relative to the axis of the hole.

26. A method according to claim 23, wherein the hole and chamfers are exclusively formed by removing portions of the laminated layers.

27. A method according to claim 23, wherein the chamfers are defined by forming drop-offs within the laminated layers, and the hole is defined by forcing a mandrel through the laminated layers.

28. A method according to claim 23, wherein the hole and chamfers are defined by forming a larger second hole in the article, and then securing a monolithic annular-shaped ceramic insert within the second hole.

* * * * *